(12) United States Patent
Chuang (10) Patent No.: US 7,431,316 B2
(45) Date of Patent: Oct. 7, 2008

(54) INFLATABLE MUDGUARD

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 536 days.

(21) Appl. No.: 11/163,326

(22) Filed: Oct. 14, 2005

(65) Prior Publication Data

US 2007/0085296 A1   Apr. 19, 2007

(51) Int. Cl.
B62D 25/18 (2006.01)
(52) U.S. Cl. .................. 280/152.3; 280/152.1; 280/852
(58) Field of Classification Search ................ 280/852, 280/152.1, 152.2, 152.3
See application file for complete search history.

(56) References Cited

U.S. PATENT DOCUMENTS

| | | | | |
|---|---|---|---|---|
| 741,997 A | * | 10/1903 | Beokwith | 280/152.3 |
| 4,319,763 A | * | 3/1982 | White | 280/152.3 |
| 5,275,427 A | * | 1/1994 | Gasser | 280/152.3 |
| 5,562,296 A | * | 10/1996 | Hall et al. | 280/152.3 |
| 5,700,022 A | * | 12/1997 | Finnson | 280/152.3 |
| 6,029,988 A | * | 2/2000 | Edwards | 280/152.2 |
| 6,199,883 B1 | * | 3/2001 | Gable | 280/152.1 |

OTHER PUBLICATIONS

Taiwanese Patent Publication No. 522956, Mar. 1, 2003, 6 pages.

* cited by examiner

Primary Examiner—Christopher Ellis
Assistant Examiner—John D Walters
(74) Attorney, Agent, or Firm—Alan Kamrath; Kamrath & Associates PA (57) ABSTRACT

An inflatable mudguard set includes an inflatable mudguard, an elastic coil and a connector. The elastic coil is connected to the inflatable mudguard. The elastic coil automatically rolls up the inflatable mudguard when the inflatable mudguard is flat. The connector is connected to or integrated with the inflatable mudguard. The connector can connect the inflatable mudguard to a bicycle.

20 Claims, 9 Drawing Sheets

INFLATABLE MUDGUARD

BACKGROUND OF THE INVENTION

1. Field of Invention

The present invention relates to an inflatable mudguard.

2. Related Prior Art

In Taiwanese Patent Publication No. 522956 is disclosed an inflatable mudguard 20. When flat, the inflatable mudguard 20 looks like a strip. The inflatable mudguard 20 includes a check valve 23 through which air can be pumped therein. The inflatable mudguard 20 is attached to a seat tube of a bicycle by means of a clamping device 30. The clamping device 30 includes an upperjaw 31 and a lowerjaw 32. The inflatable mudguard 20 includes an end 21 sandwiched between the jaws 31 and 32. The end 21 of the inflatable mudguard 20 is clamped means of the clamping device 30 firmly as the jaws 31 and 32 are forced toward each other by means of two screws 40. The lower jaw 32 is formed with a C-clip 321 for clipping the seat tube. The clipping of the seat tube by the C-clip 321 is tightened by means of a buckle 33.

However, several problems have been encountered in the use of this conventional inflatable mudguard.

Firstly, it is inconvenient to pump the inflatable mudguard 20. The check valve 23 of the inflatable mudguard 20 is different from that of a bicycle wheel. Hence, a rider needs a pump for the inflatable mudguard 20 and another pump for the wheels. Alternatively, the rider has to pump the inflatable mudguard 20 with his or her mouth.

Secondly, its performance is poor, and its lifecycle short. When flat, it looks like a strip. When pumped, it provides limited support for itself. When much mud is adhered to it, or when a force is exerted on it, its rear end will fall. In worst cases, its rear end will rub against a wheel and soon wear away.

Thirdly, it is inconvenient to store the inflatable mudguard 20. When flat, the inflatable mudguard 20 looks like a strip. The inflatable mudguard 20 cannot be rolled up and tied automatically. The rider has to roll up the inflatable mudguard 20 and tie the same manually.

Therefore, the present invention is intended to obviate or at least alleviate the problems encountered in prior art.

SUMMARY OF INVENTION

According to the present invention, an inflatable mudguard set includes an inflatable mudguard, an elastic coil and a connector. The elastic coil is connected to the inflatable mudguard. The elastic coil automatically rolls up the inflatable mudguard when the inflatable mudguard is flat. The connector is connected to or integrated with the inflatable mudguard. The connector can connect the inflatable mudguard to a bicycle.

The primary advantage of the inflatable mudguard set of the present invention is to provide a rider with the convenience of automatically rolling up the inflatable mudguard with the elastic coil when the inflatable mudguard is flat.

Other advantages and novel features of the present invention will become more apparent from the following detailed description referring to the attached drawings.

BRIEF DESCRIPTION OF THE DRAWINGS

The present invention will be described through detailed illustration of three embodiments referring to the drawings.

DETAILED DESCRIPTION OF THE EMBODIMENTS

Figure 1:
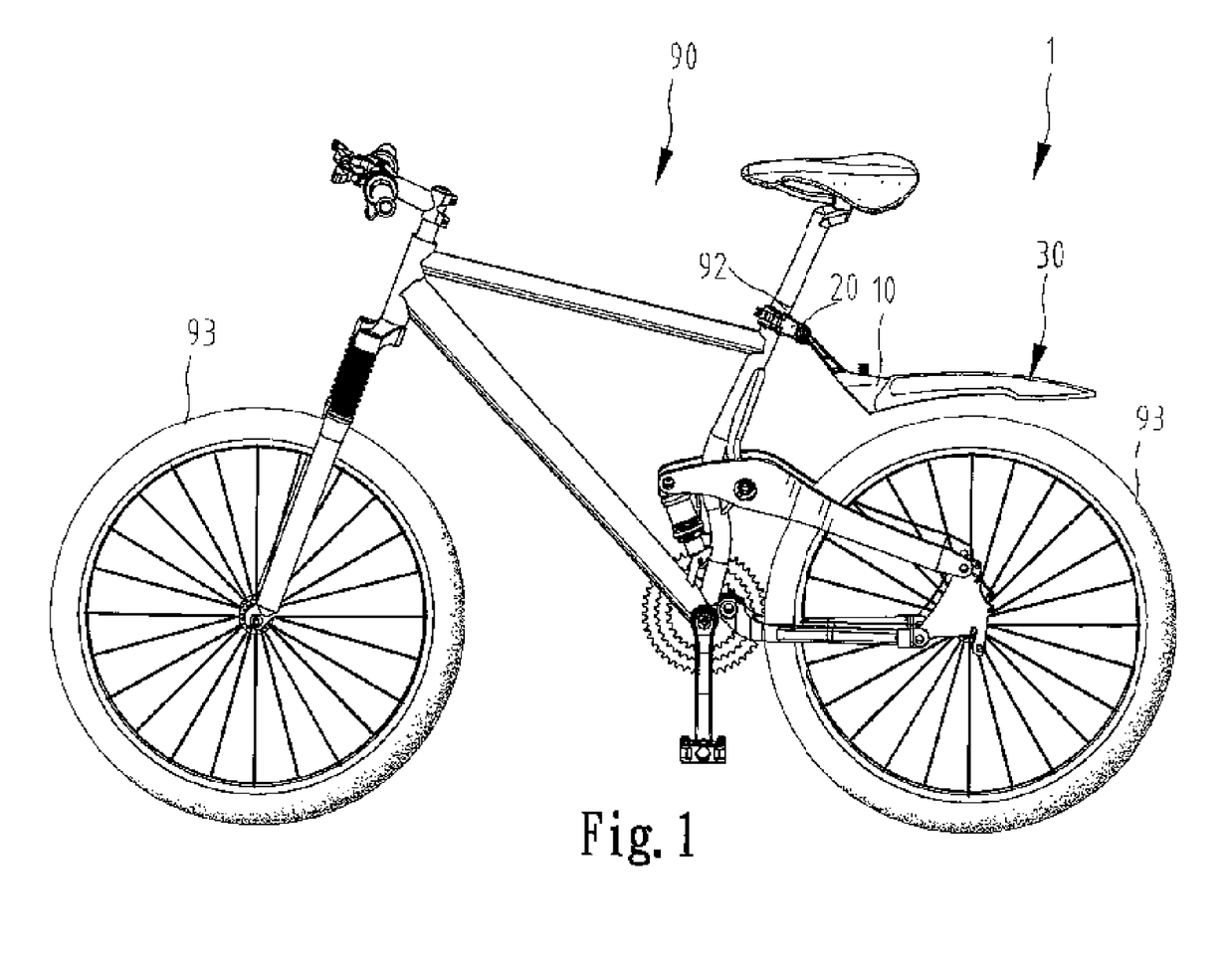
FIG. 1 is a side view of a bicycle with an inflatable mudguard set according to the first embodiment of the present invention.

Referring to FIG. 1, a bicycle 90 is equipped with an inflatable mudguard set 1 according to a first embodiment of the present invention. The bicycle 90 includes a seat tube 92 and two wheels 93.

Figure 2:
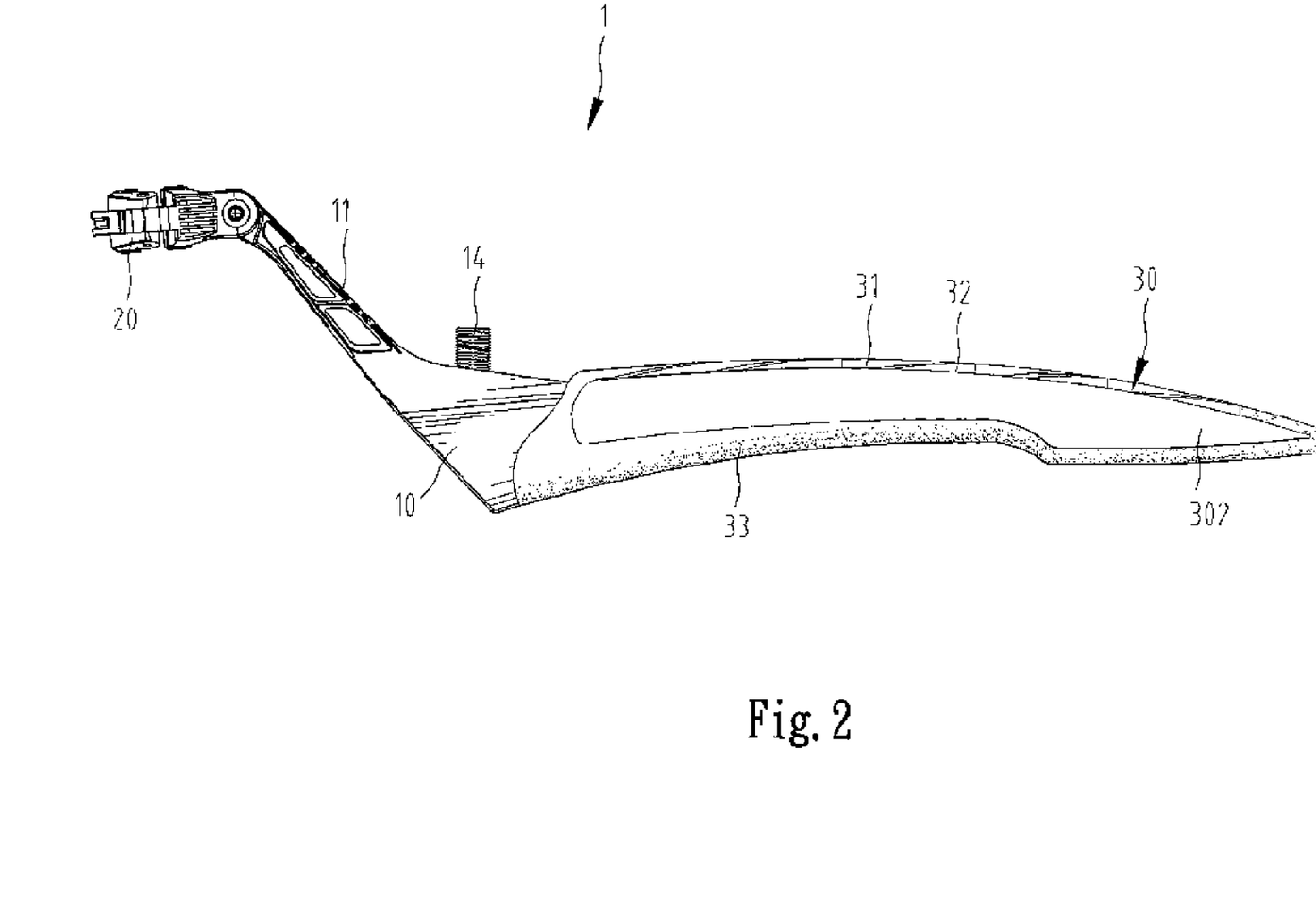
FIG. 2 is a side view of the inflatable mudguard set shown in FIG. 1.
Figure 3:
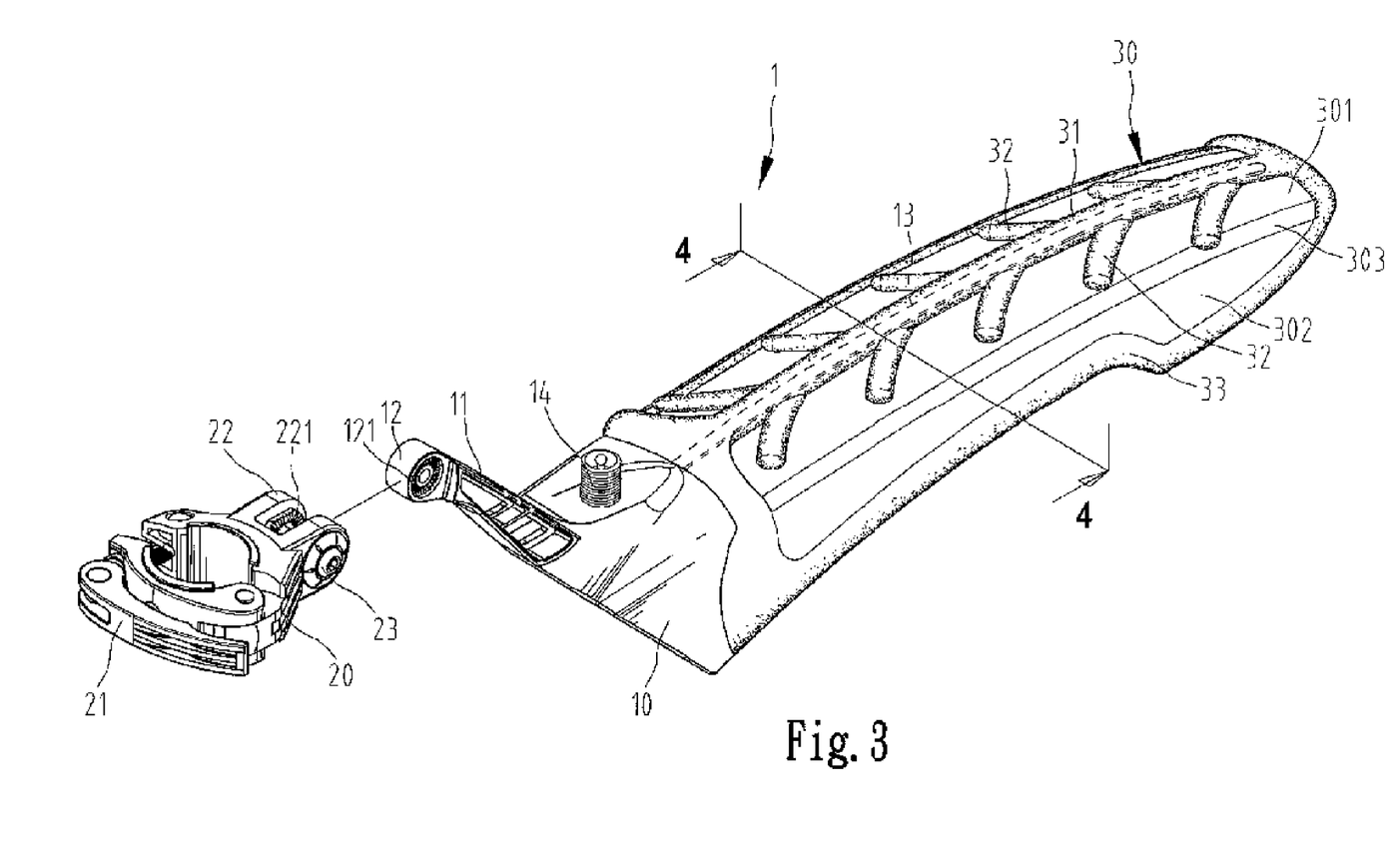
FIG. 3 is an exploded view of the inflatable mudguard set shown in FIG. 2.

Referring to FIGS. 2 and 3, the inflatable mudguard set 1 includes an inflatable mudguard 10 and a connector 20 for connecting the inflatable mudguard 10 to the seat tube 92.

The connector 20 includes a quick release member 21 for clamping the seat tube 92 and a pair of lugs 22 connected to or integrated with the quick release member 21. Each of the lugs 22 includes a plurality of teeth 221 on a side so that they face the teeth 221 of the other lug 22.

The inflatable mudguard 10 includes a beam 11 formed on a front portion, a ring 12 formed on the beam 11, a valve 14 installed on a middle portion and an inflatable member 30 formed on a rear portion.

The beam 11 and the ring 12 make a lug. The ring 12 includes two sides each formed with a plurality of teeth 121. In assembly, the ring 12 is put between the lugs 22. A fastener 23 is driven in the lugs 22 and the ring 12, thus connecting the connector 20 to the inflatable mudguard 10. The teeth 121 are engaged with the teeth 221 in order to position the inflatable mudguard 10 relative to the connector 20.

The valve 14 is identical to the valves (not shown) of the wheels 93. The valve 14 may belong to American type or French type.

The inflatable member 30 includes a strip for guarding against mud and a tube system inflatable for supporting the strip.

The strip includes a canopy 301, two aprons 302 and two elastic ribs 303 each formed between one of the aprons 302 and the canopy 301. The elastic ribs 303 help support the canopy 301 and the aprons 302.

The tube system includes a stem tube 31, many branch tubes 32 and a peripheral tube 33. The stem tube 31 is in communication with the valve 14 so that air can be pumped in the stem tube 31 from the valve 14. The branch tubes 32 are in communication with the stem tube 31 so that the air can go to the branch tubes 32 from the stem tube 31. The peripheral tube 33 is in communication with the stem tube 31 so that the air can go to the peripheral tube 33 from the stem tube 31.

The stem tube 31 extends on the canopy 301 axially. The branch tubes 32 extend on the canopy 301 obliquely, i.e., not perfectly axially nor transversely. Thus, the branch tubes 32 help expand the canopy 301 both axially and transversely. Each of the branch tubes 32 extends from the stem tube 31 to one of the ribs 303. The peripheral tube 33 extends along the edge of the strip.

Figure 4:
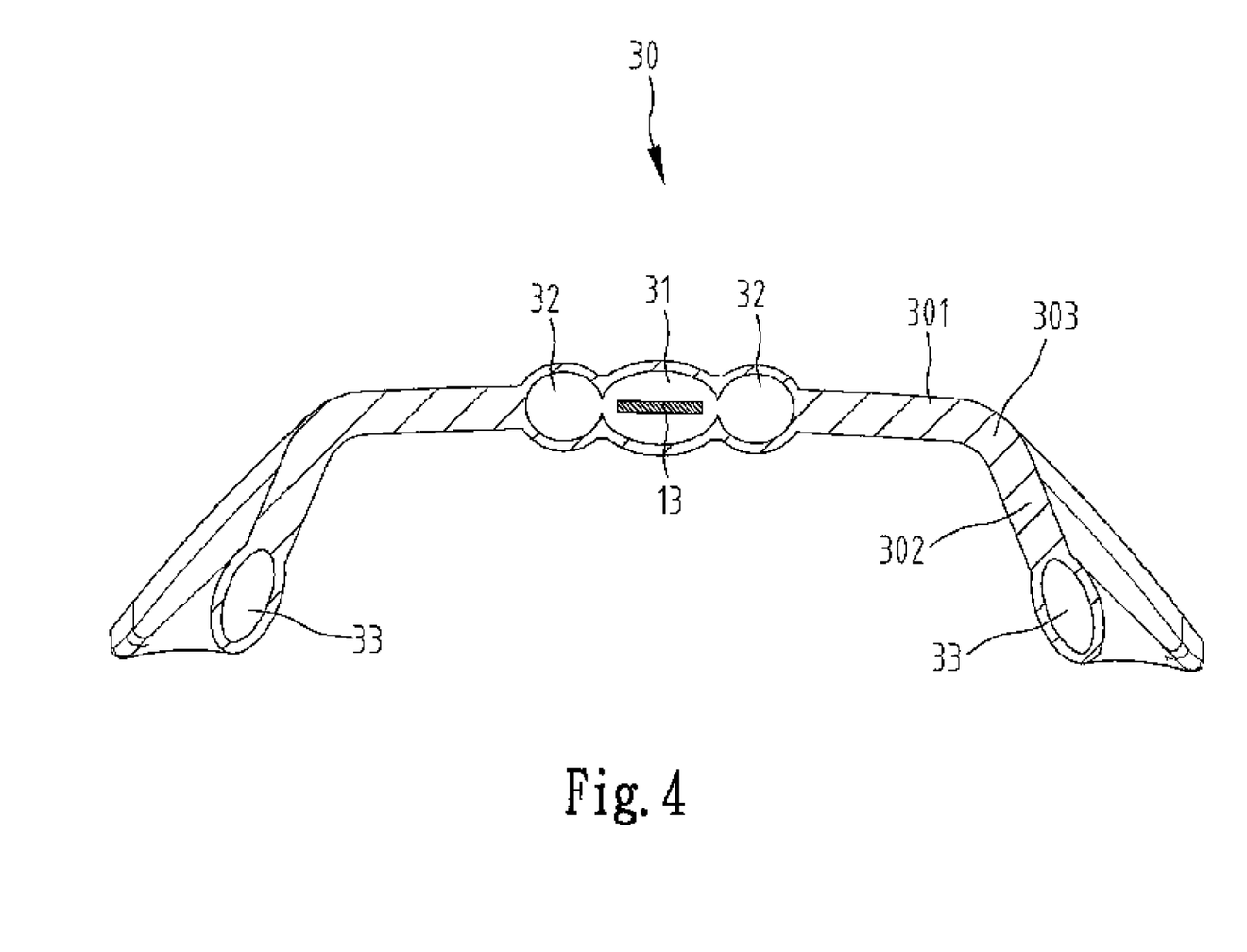
FIG. 4 is a cross-sectional view taken along a line 4-4 in FIG. 3.
Figure 5:
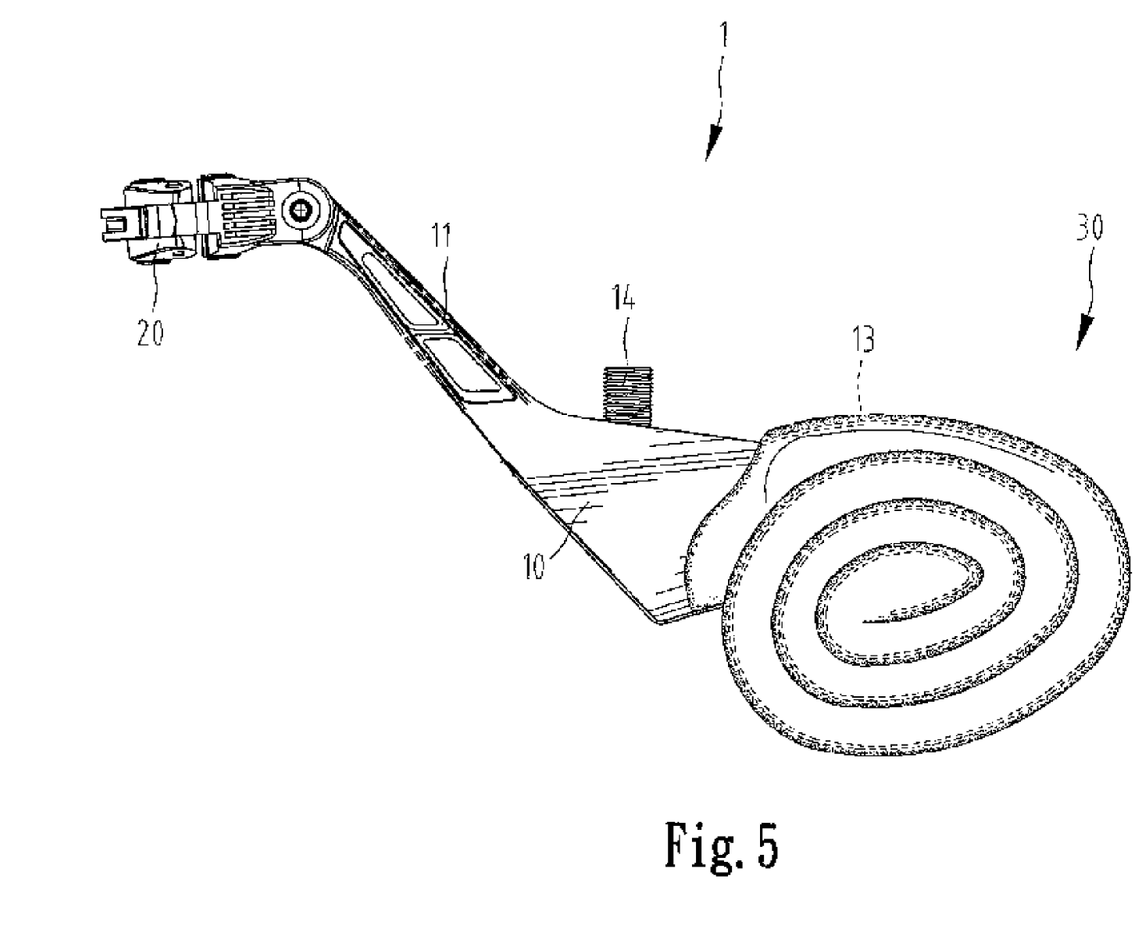
FIG. 5 is a side view of the inflatable mudguard set shown in FIG. 2 in a rolled-up position.

Referring to FIGS. 4 and 5, an elastic coil 13 is provided in the stem tube 31. The elastic coil 13 tends to coil, thus automatically coiling the inflatable member 30 when the inflatable member 30 is flat. Thus, a rider is spared the trouble of rolling up the inflatable mudguard 10.

On the contrary, when inflated, the inflatable member 30 is able to stretch the elastic coil 13.

Figure 6:
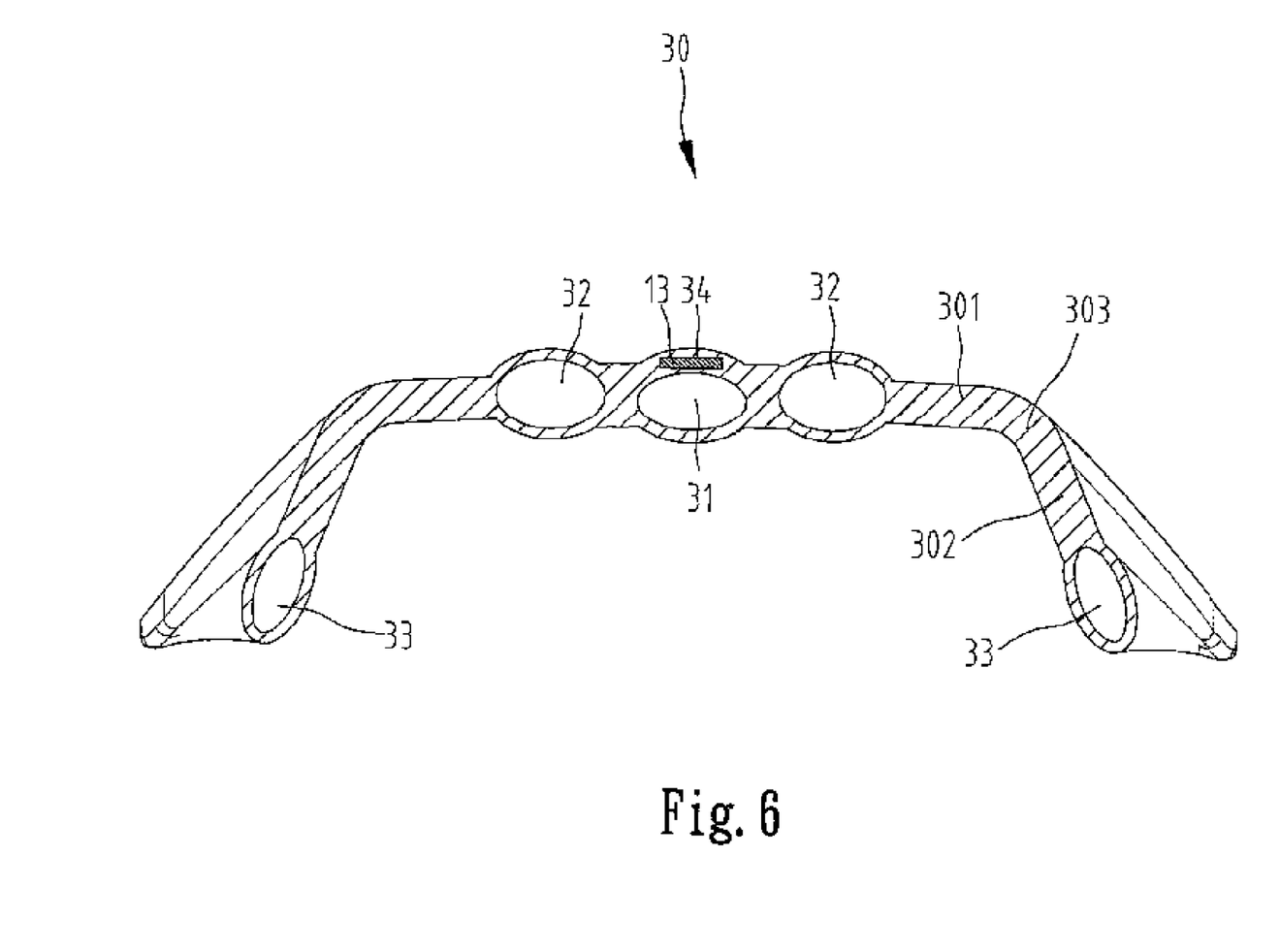
FIG. 6 is a cross-sectional view of an inflatable mudguard set according to the second embodiment of the present invention.

Referring to FIG. 6, there is shown an inflatable mudguard set in accordance with a second embodiment of the present invention. The second embodiment is identical to the first embodiment except putting the elastic coil 13 in a space 34 instead of the stem tube 31.

Figure 7:
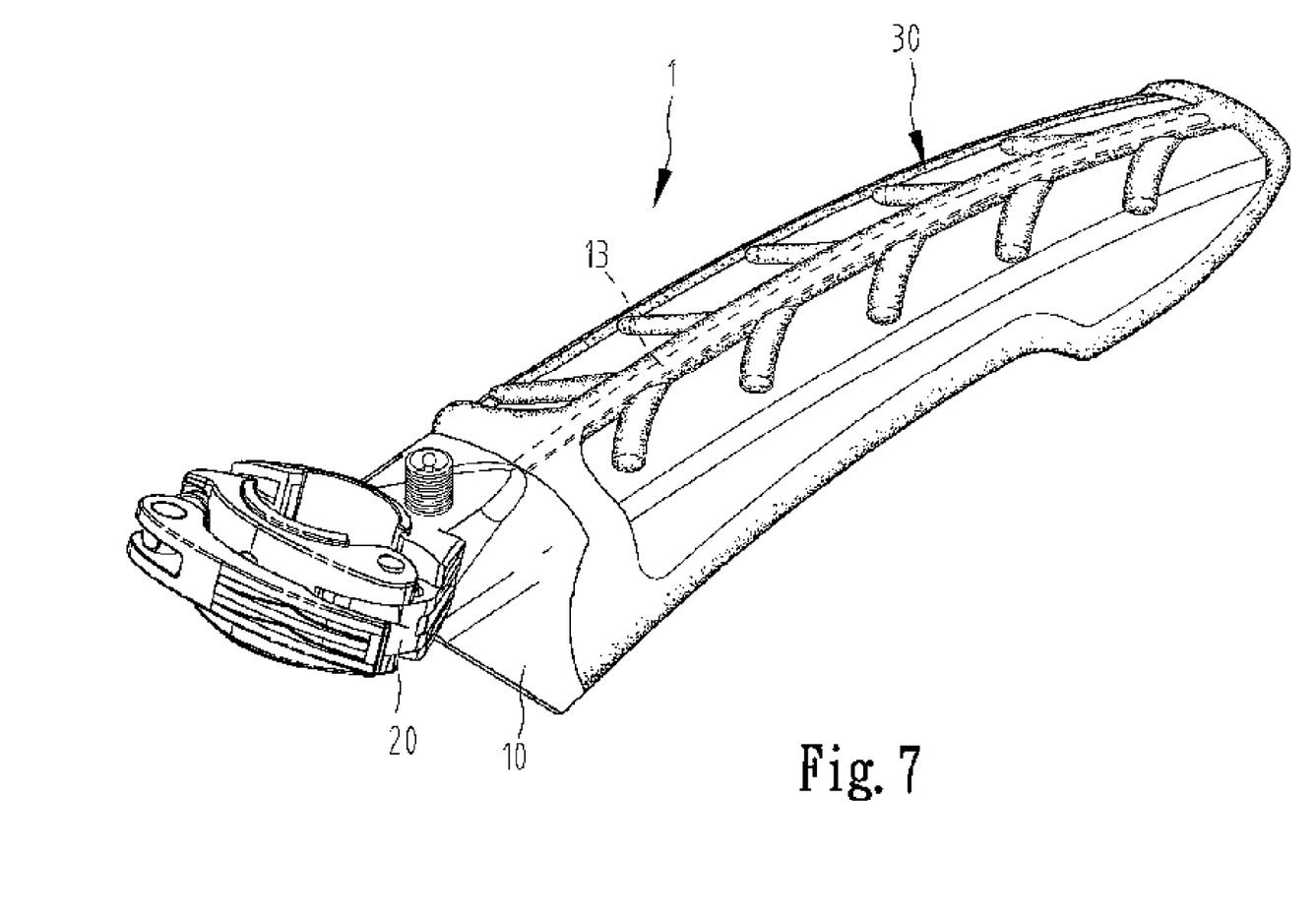
FIG. 7 is a perspective view of an inflatable mudguard set according to the third embodiment of the present invention.
Figure 8:
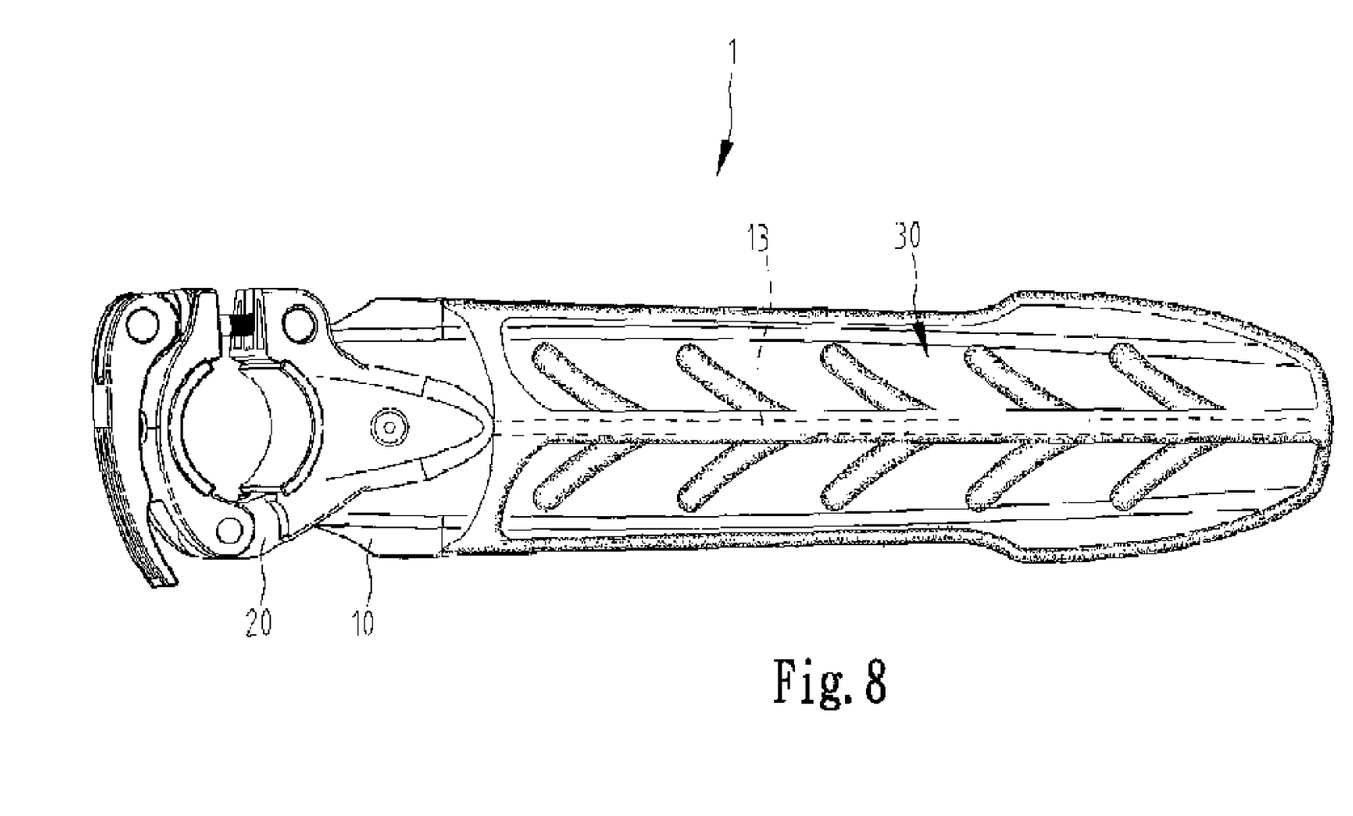
FIG. 8 is a top view of the inflatable mudguard set shown in FIG. 7.
Figure 9:
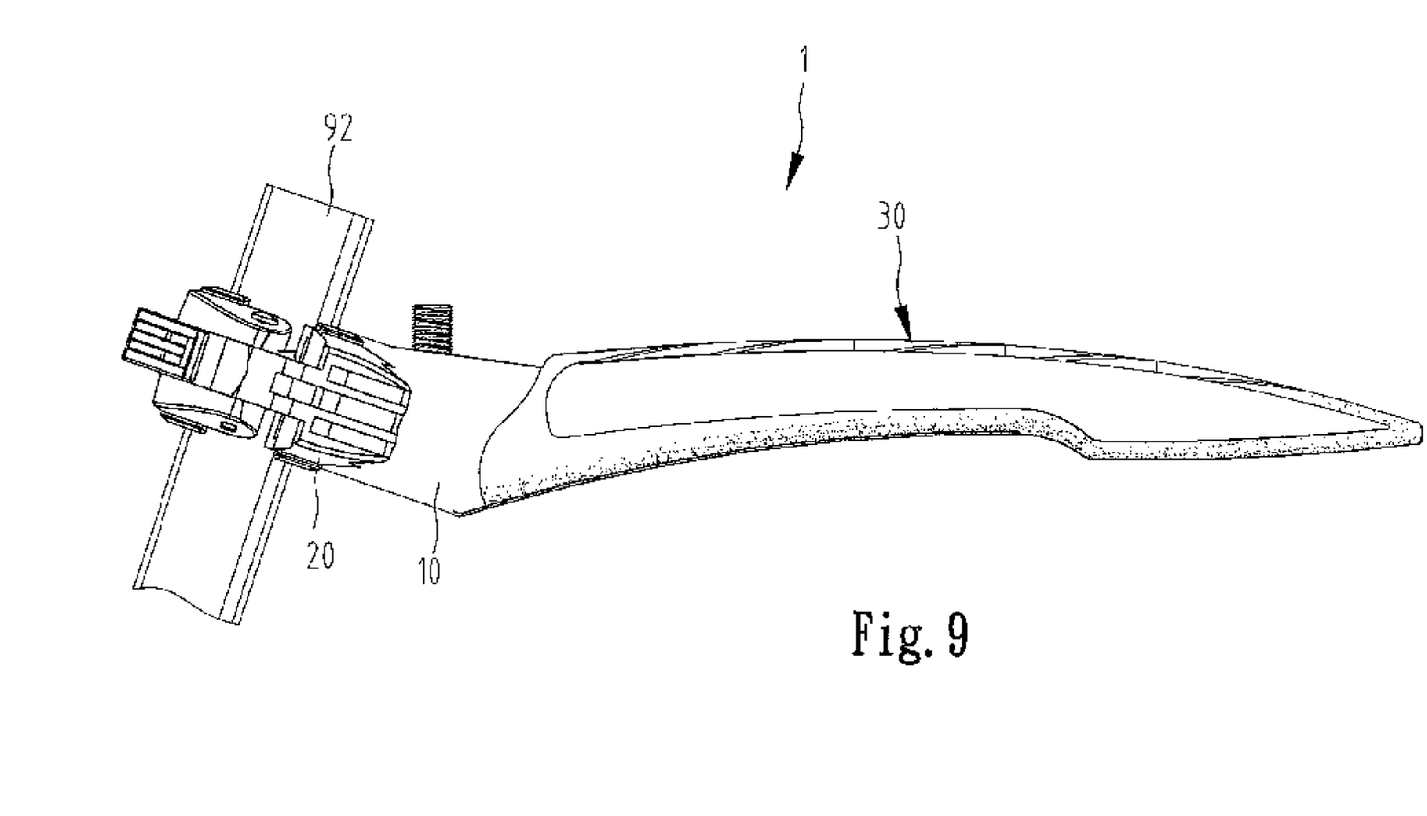
FIG. 9 is a side view of the inflatable mudguard set shown in FIG. 7.

Referring to FIGS. 7 through 9, there is shown an inflatable mudguard set in accordance with a third embodiment of the present invention. The third embodiment is identical to the first embodiment except integrating the inflatable mudguard with the connector 20. Hence, the beam 11, the ring 12, the lugs 22 and the fastener 23 are saved.

The inflatable mudguard set 1 of the present invention exhibits several advantages.

Firstly, it spares the rider the trouble of carrying two pumps. The valve 14 is identical to the valves of the wheels 93 so that the rider can pump the inflatable mudguard set 1 and the wheels 93 with a same pump.

Secondly, it is reliable. The elastic ribs 303 help sustain the expanded shape. The obliquely extending branch tubes 32 help sustain the expanded shape.

Thirdly, it spares the rider the trouble of rolling up the inflatable member 30. The elastic coil 13 automatically rolls up the inflatable member 30 when the inflatable member 30 is flat.

The present invention has been described via detailed illustration of some embodiments. Those skilled in the art can derive variations from the embodiments without departing from the scope of the present invention. Therefore, the embodiments shall not limit the scope of the present invention defined in the claims.

What is claimed is:

1. An inflatable mudguard set comprising:
   an inflatable mudguard;
   an elastic coil for automatically rolling up the inflatable mudguard when the inflatable mudguard is flat; and
   a connector for connecting the inflatable mudguard to a bicycle.

2. The inflatable mudguard set according to claim 1 wherein the inflatable mudguard comprises a strip and a tube system that when inflated can expand the strip.

3. The inflatable mudguard set according to claim 2 wherein the strip comprises a canopy, two aprons and two elastic ribs each formed between one of the aprons and the canopy.

4. The inflatable mudguard set according to claim 3 wherein the tube system comprises a valve, a stem tube in communication with the valve and on the canopy and a plurality of branch tubes in communication with the stem tube and on the canopy.

5. The inflatable mudguard set according to claim 4 wherein the stem tube axially extends on the canopy.

6. The inflatable mudguard set according to claim 4 wherein the branch tubes obliquely extend on the canopy.

7. The inflatable mudguard set according to claim 4 wherein the tube system further comprises a peripheral tube in communication with the stem tube and along the edge of the canopy and the edges of the aprons.

8. The inflatable mudguard set according to claim 2 wherein the tube system comprises a valve, a stem tube in communication with the valve and a plurality of branch tubes in communication with the stem tube.

9. The inflatable mudguard set according to claim 8 wherein the stem tube axially extends on the strip.

10. The inflatable mudguard set according to claim 8 wherein the branch tubes obliquely extend on the strip.

11. The inflatable mudguard set according to claim 8 wherein the tube system further comprises a peripheral tube in communication with the stem tube and along the edge of the strip.

12. The inflatable mudguard set according to claim 8 wherein the elastic coil is put in the stem tube.

13. The inflatable mudguard set according to claim 8 wherein the inflatable mudguard defines a space for receiving the elastic coil.

14. The inflatable mudguard set according to claim 1 wherein the inflatable mudguard comprises a lug formed thereon, wherein the connector comprises at least one lug pivotally connected to the lug of the inflatable mudguard.

15. The inflatable mudguard set according to claim 14 wherein the lug of the inflatable mudguard comprises a beam and a ring on the beam.

16. The inflatable mudguard set according to claim 14 wherein the lug of the inflatable mudguard comprises a plurality of teeth on a side, wherein the lug of the connector comprises a plurality of teeth on a side for engagement with the teeth of the lug of the inflatable mudguard, thus positioning the inflatable mudguard relative to the connector.

17. The inflatable mudguard set according to claim 14 wherein the connector comprises two lugs for sandwiching the lug of the inflatable mudguard.

18. The inflatable mudguard set according to claim 17 wherein each of the lugs of the connector comprises a plurality of teeth on a side, wherein the lug of the inflatable mudguard comprises a plurality of teeth formed on both sides for engagement with the teeth of the lugs of the connector, thus positioning the inflatable mudguard relative to the connector.

19. The inflatable mudguard set according to claim 14 wherein the connector comprises a quick release member for clamping the bicycle.

20. The inflatable mudguard set according to claim 14 wherein the connector is integrated with the inflatable mudguard.

* * * * *